United States Patent
Okumura et al.

(10) Patent No.: US 7,473,492 B2
(45) Date of Patent: Jan. 6, 2009

(54) LITHIUM SECONDARY BATTERY

(75) Inventors: Takefumi Okumura, Hitachi (JP); Shin Nishimura, Hitachi (JP); Norio Iwayasu, Hitachinaka (JP); Shoichi Yokoyama, Yokohama (JP); Takeshi Yabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/717,646

(22) Filed: Nov. 21, 2003

(65) Prior Publication Data

US 2004/0101759 A1   May 27, 2004

Related U.S. Application Data

(63) Continuation-in-part of application No. 10/623,497, filed on Jul. 22, 2003, now abandoned.

(30) Foreign Application Priority Data

Nov. 21, 2002   (JP)   ............................. 2002-337790

(51) Int. Cl.
    *H01M 6/18*   (2006.01)
(52) U.S. Cl. .................. 429/317; 429/322; 429/309; 429/306; 429/231.95; 429/231.8
(58) Field of Classification Search ................ 429/317, 429/306, 309, 231.95, 322, 33, 231.8
    See application file for complete search history.

(56) References Cited

U.S. PATENT DOCUMENTS

| | | | |
|---|---|---|---|
| 6,833,220 B1 * | 12/2004 | Yokoyama et al. | 429/317 |
| 6,998,465 B2 * | 2/2006 | Yokoyama et al. | 528/394 |
| 7,045,242 B2 * | 5/2006 | Nishiura et al. | 429/330 |
| 7,230,057 B2 * | 6/2007 | Okumura et al. | 429/309 |

FOREIGN PATENT DOCUMENTS

| | | | |
|---|---|---|---|
| EP | 1 160 268 A1 | | 12/2001 |
| EP | 1 431 300 A1 | | 6/2004 |
| JP | 2002-348323 | * | 12/2002 |
| WO | WO 01/18094 | * | 3/2001 |
| WO | WO 03/031453 | * | 4/2003 |

OTHER PUBLICATIONS

Search Report, issued Feb. 3, 2005 (2 pp.), for FA 643842 (FR 0313581).

* cited by examiner

*Primary Examiner*—Laura S Weiner
(74) *Attorney, Agent, or Firm*—Antonelli, Terry, Stout & Kraus, LLP.

(57) ABSTRACT

The object of the present invention is to provide a lithium secondary battery of high output. According to the present invention, there is provided a lithium secondary battery having a positive electrode and a negative electrode which reversibly intercalate and deintercalate lithium and an electrolyte containing an ion conductive material and an electrolytic salt, where said electrolyte contains an electrolytic salt and a boron-containing compound represented by the following formula (1) or a polymer thereof, or a copolymer of the compounds of the following formulas (2) and (3).

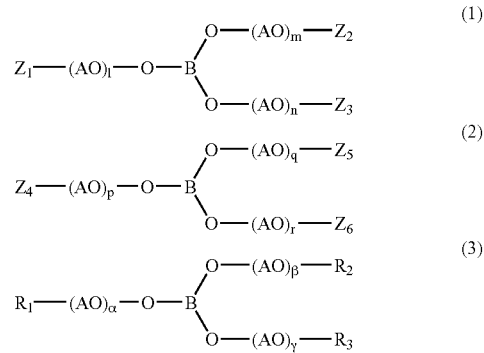

16 Claims, 1 Drawing Sheet

LITHIUM SECONDARY BATTERY

CROSS-REFERENCE TO THE RELATED U.S. APPLICATION

This is a continuation-In-Part Application of U.S. Ser. No. 10/623,497 filed on Jul. 22, 2003, now abandoned content of which is hereby incorporated by reference.

BACKGROUND OF THE INVENTION

The present invention relates to a lithium secondary battery.

From the point of ionic conductivity, liquid electrolytes have hitherto been used as electrolytes constituting electrochemical devices such as batteries, capacitors, sensors, etc. However, there are problems such as causing damages of devices due to leakage of the liquid electrolyte.

On the other hand, recently, there are proposed secondary batteries in which solid electrolytes such as inorganic crystalline materials, inorganic glass, organic polymers, etc. are used as electrolytes. When these solid electrolytes are used, leakage of carbonate solvents does not occur and ignition of electrolytes can be diminished, and, hence, reliability and safety of the devices are improved as compared with when conventional liquid electrolytes containing carbonate solvents are used.

Furthermore, organic polymers are generally superior in processability and moldability, and the resulting electrolytes have flexibility and bending processability. As a result, design freedom becomes higher for the devices to which they are applied. Thus, development of them is expected.

However, at present, the organic polymers are inferior to other materials in ionic conductivity. For example, it has been widely attempted to use polyethylene oxide containing a specific alkali metal ion as polymer electrolytes (e.g., JP-A-2002-158039), but a value of ionic conductivity (1 mS/cm or higher at room temperature) which is practically required for electrolytes of lithium ion secondary batteries has not yet been obtained.

Furthermore, JP-A-2001-72877 discloses copolymers of boron-containing polymerizable monomers and other polymerizable monomers. The polymers are ion conductive materials which can be improved in transport number of charge carriers, and there are disclosed polymer electrolytes and electrochemical devices using the polymers.

However, the above-mentioned organic polymers are inferior to other materials in ionic conductivity. For example, the above publications disclose polymer electrolytes comprising polyethylene oxide containing a specific alkali metal salt, but these polymer electrolytes do not have a value of ionic conductivity (1 mS/cm or higher at room temperature) which is practically required for electrolytes of lithium secondary batteries. The object of the present invention is to provide a lithium secondary battery excellent in output characteristics in which a polymer electrolyte of high ionic conductivity is used.

SUMMARY OF THE INVENTION

According to one embodiment of the present invention, there is provided a lithium secondary battery having a positive electrode and a negative electrode which reversibly intercalate and deintercalate lithium and an electrolyte containing an ion conductive material and an electrolytic salt, wherein said ion conductive material contains a boron-containing compound represented by the following formula (1) or said ion conductive material contains a mixture of a boron-containing compound represented by the following formula (2) and a boron-containing compound represented by the following formula (3):

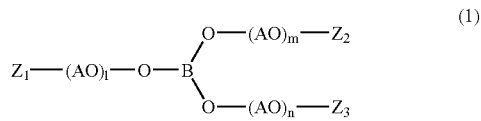

wherein B represents a boron atom; $Z_1$, $Z_2$ and $Z_3$ each represent an organic group having an acryloyl group or a methacryloyl group or a hydrocarbon group of 1-10 carbon atoms, with the proviso that one or two of $Z_1$, $Z_2$ and $Z_3$ are the organic groups having an acryloyl group or a methacryloyl group; AO represents an oxyalkylene group of 1-6 carbon atoms and comprises one or two or more of the oxyalkylene groups; and l, m and n each represent an average degree of polymerization of the oxyalkylene group and are each more than 0 and less than 4, provided that l+m+n is 1 or more;

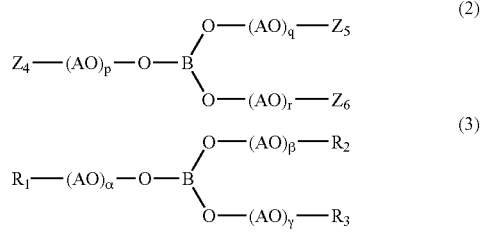

wherein B represents a boron atom; $Z_4$, $Z_5$ and $Z_6$ each represent an organic group having an acryloyl group or a methacryloyl group or a hydrocarbon group of 1-10 carbon atoms, with the proviso that at least one of $Z_4$, $Z_5$ and $Z_6$ is said organic group having an acryloyl group or a methacryloyl group; $R_1$, $R_2$ and $R_3$ each represent a hydrocarbon group of 1-10 carbon atoms; AO represents an oxyalkylene group of 1-6 carbon atoms and comprises one or two or more of the oxyalkylene groups; and p, q, r, α, β and γ each represent an average degree of polymerization of the oxyalkylene group and are each more than 0 and less than 4, provided that each of the sum p+q+r and the sum α+β+γ is 1 or more.

According to another embodiment of the present invention, there is provided a lithium secondary battery where said ion conductive material contains a polymer of the boron-containing compound containing an oxyalkylene group and represented by the formula (1) or said ion conductive material contains a polymer of the boron-containing compound represented by the formula (3) and the boron-containing compound represented by the formula (2).

The molecular weight of the materials represented by the formulas (1), (2) and (3) is preferably 300-1000, especially preferably 500-800. When the materials have the molecular weight within the above range, the degree of polymerization of the oxyalkylene group is small, and lithium ions which coordinate with ether oxygen can readily transfer to increase the ionic conductivity, resulting in excellent output characteristics of the lithium secondary battery.

BRIEF DESCRIPTION OF DRAWING

In FIG. 1, the symbols denote the following.

Figure 1:
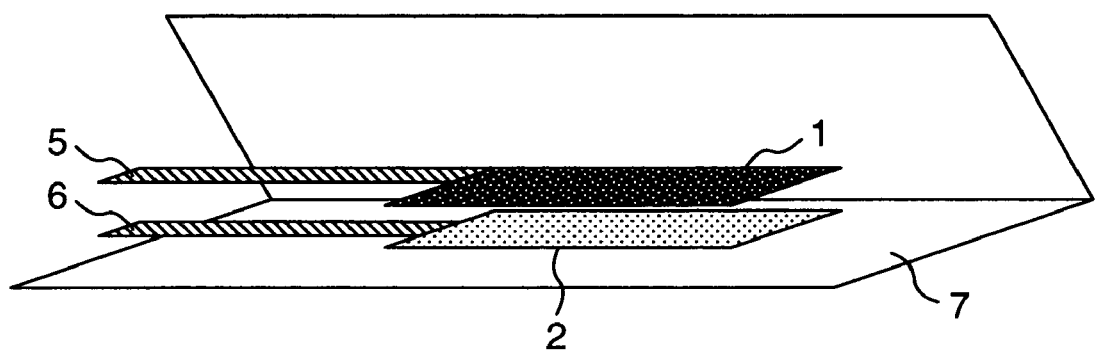
FIG. 1 is a schematic oblique view illustrating the structure of a test battery used in the examples.

1: Positive electrode; 2: negative electrode; 5: positive electrode terminal made of stainless steel; 6: negative electrode terminal made of stainless steel; 7: aluminum laminate film.

DETAILED DESCRIPTION OF THE INVENTION

The present invention will be explained in detail below.

The compounds represented by the formulas (1), (2) and (3) in the present invention contain an oxyalkylene group. One or two or more oxyalkylene groups may be contained in one molecule of the compounds. The carbon number of the oxyalkylene group is 6 or less, preferably 4 or less.

One or two of $Z_1$, $Z_2$ and $Z_3$ in the formula (1) are the organic groups having an acryloyl group or a methacryloyl group, and other one or two are hydrocarbon groups of 1-10 carbon atoms.

$Z_4$, $Z_5$ and $Z_6$ in the formula (2) are organic groups having an acryloyl group or a methacryloyl group or hydrocarbon groups of 1-10 carbon atoms. At least one of them is the organic group having an acryloyl group or a methacryloyl group, preferably all of them are organic groups having an acryloyl group or a methacryloyl group.

The organic groups having an acryloyl group or a methacryloyl group include those having the acryloyl group or methacryloyl group at an end. By using organic groups having a polymerizable double bond in the present invention, there can be obtained electrolytes satisfactory in electric characteristics and handleability.

$R_1$, $R_2$ and $R_3$ in the formula (3) are hydrocarbon groups of 1-10 carbon atoms. As examples of the hydrocarbon groups of 1-10 carbon atoms, mention may be made of aliphatic groups such as methyl group, ethyl group, propyl group, butyl group, pentyl group, hexyl group, heptyl group, octyl group, nonyl group, decyl group, etc., aromatic hydrocarbon groups such as phenyl group, toluyl group, naphthyl group, etc., alicyclic hydrocarbon groups such as cyclopentyl group, cyclohexyl group, methylcyclohexyl group, dimethylcyclohexyl group, etc. The hydrocarbon groups of 4 or less carbon atoms are preferred, and methyl group having one carbon atom is especially preferred.

l, m and n in the formula (1) are average degrees of polymerization of the oxyalkylene group and are more than 0 and less than 4, preferably 1-3. l+m+n is not less than 1 or more, preferably 3-9.

p, q, r, α, β and γ in the formulas (2) and (3) are average degrees of polymerization of the oxyalkylene group and are more than 0 and less than 4, preferably 1-3. p+q+r and α+β+γ are 1 or more, preferably 3-9, respectively.

The boron-containing compounds of the formulas (1), (2) and (3) can be produced by known methods, and can be produced, for example, by the following method. A boron compound such as boric acid, boric anhydride, an alkyl borate, or the like is added to an oxyalkylene compound having a hydroxyl group, and esterification of boric acid is carried out under reduced pressure at 50-200° C. while passing a dry gas, thereby obtaining the boron-containing compound. For example, the boron-containing compound can be produced by carrying out the esterification with stirring for 2 to 12 hours at a reaction temperature of 60-120° C. while introducing a proper amount of dry air and carrying out dehydration or devolatilization operation under reduced pressure of 1.33-66.7 kPa (10-500 mmHg).

Especially when the decrease of water content is taken into consideration, it is preferred to produce the boron-containing compound using a trialkyl borate, particularly, trimethyl borate. Furthermore, especially when a trialkyl borate is used, it is preferred to use 1.0-10 mols of a trialkyl borate for 3.0 mols of the oxyalkylene compound having a hydroxyl group and to distill off the volatile matter produced by the ester interchange reaction of boric acid and excess trialkyl borate.

The mixing ratio of the compound of the formula (2) and the compound of the formula (3) is 0.1-9, preferably 0.5-4, more preferably 0.5-3, especially preferably 1-2.5 in molar ratio [(molar number of the compound of the formula (3))/(molar number of the compound of the formula (2))]. If the molar ratio is lower than 0.1, mechanical strength increases and flexibility decreases to cause difficulty in molding of an electrolyte film. If the molar ratio is more than 9, the mechanical strength is decreased, and formation of the solid polyelectrolyte is difficult. If the molar ratio exceeds 4, the mechanical strength decreases and handling becomes difficult.

If the molar ratio [(the number of moles of the compound of (formula 3))/(the number of moles of the compound of (formula 2))] is 4-9, the molecules move actively with their geometry maintained and inonic conductivity is increased though the mechanical strength is decreased, resulting in difficult handling.

The polymer of the boron-containing compound represented by the formula (1) and the polymer of a mixture of the compound represented by the formula (2) and the compound represented by the formula (3) can be obtained by known methods. For example, energies such as visible light, ultraviolet rays, electron rays, heat, etc. are used with optionally using polymerization initiators, etc. The above polymers can be obtained by either ionic polymerization or radical polymerization.

In producing polymers from the boron-containing compound represented by the formula (1) or a mixture of the boron-containing compounds represented by the formulas (2) and (3), the polymerization initiator may or may not be used, and heat radical polymerization using radical polymerization initiator is preferred from the points of operability and polymerization rate.

As the radical polymerization initiators, mention may be made of, for example, organic peroxides such as t-butyl peroxypivalate, t-hexyl peroxypivalate, methyl ethyl ketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butyl hydroperoxide, cumene hydroperoxide, 2,5-dimethylhexane-2,5-dihydroperoxide, di-t-butyl peroxide, t-butylcumyl peroxide, dicumyl peroxide, α,α'-bis(t-butylperoxy-m-isopropyl)benzene, 2,5-dimethyl-2,5-di(t-butylperoxy)hexane, benzoyl peroxide, t-butylperoxyisopropyl carbonate, etc., azo compounds such as 2,2'-azobisisobutyronitrile, 2,2'-azobis(2-methylbutyronitrile), 2,2'-azobis(4-methoxy-2,4-dimethylvaleronitrile), 2,2'-azobis(2,4-dimethylvaleronitrile), 1,1'-azobis (cyclohexane-1-carbonitrile), 2-(carbamoylazo)isobutyronitrile, 2-phenylazo-4-methoxy-2,4-dimethyl-valeronitrile, 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-hydroxyphenyl]-2-methylpropionamidine]dihydrochloride, 2,2'-azobis[2-methyl-N-(phenylmethyl)propionamidine]dihydrochloride, 2,2'-azobis[2-methyl-N-(2-propenyl)propioneamidine]dihydrochloride, 2,2'-azobis(2-methylpropioneamidine)dihydrochloride, 2,2'-azobis[N-(2-hydroxyethyl)-2-methylpropioneamidine]dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl]propane}dihydrochloride, 2,2'-azobis[2-(2-imidazolin-2-yl]propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl) ethyl]propionamide}, 2,2'-azobis[2-methyl-N-(2-hydroxyethyl)propionamide], 2,2'-azobis(2-methylpropionamide)dihydrate, 2,2'-azobis(2,4,4-trimethylpentane), 2,2'-azobis(2-methylpropane), dimethyl 2,2'-azobisisobutyrate, 4,4'-azobis(4-cyanovaleric acid), 2,2'-azobis[2-(hydroxymethyl)propionitrile, etc.

Production of the polymers using radical polymerization initiators can be carried out at a temperature in the usually employed range and for a usually employed polymerization time. For the purpose of not damaging the members used for electrochemical devices, it is preferred to use radical polymerization initiators having a 10 hour-half life temperature range of 30-90° C. which is an indication of decomposition temperature and decomposition rate. The amount of the initiators used in the present invention is 0.01-10 mol %, preferably 0.1-5 mol % based on the polymerizable functional group.

The electrolytic salts used in the present invention are not particularly limited as long as they are soluble in the boron-containing compounds having an oxyalkylene group or the polymers obtained by polymerizing the compounds, and preferred examples thereof are those compounds which comprise metallic cations and anions selected from chloride ion, bromide ion, iodide ion, perchlorate ion, thiocyanate ion, tetrafluoroborate ion, hexafluorophosphate ion, trifluoromethanesulfonideimidate ion, stearylsulfonate ion, octylsulfonate ion, dodecylbenzenesulfonate ion, naphthalenesulfonate ion, dodecylnapthalenesulfonate ion, 7,7,8,8-tetracyano-p-quinodimethane ion, and lower aliphatic carboxylate ions. The metallic cations include, for example, Li, Na, K, Rb, Cs, Mg, Ca and Ba metal ions. Concentration of the electrolytic salt is usually 0.0001-1, preferably 0.001-0.5 in molar ratio based on the total molar number of ether oxygen atoms in the oxyalkylene group in the ion conductive polymer, namely, (molar number of electrolytic salt)/(total molar number of ether oxygen atoms in oxyalkylene group). If the molar ratio exceeds 1, processability, moldability and mechanical strength of the resulting polymer electrolytes are deteriorated.

As the positive electrodes which reversibly intercalate and deintercalate lithium used in the present invention include, for example, laminar compounds such as lithium cobaltate (LiCoO$_2$), lithium nickelate (LiNiO$_2$), etc., the above compounds substituted with one or more transition metals, lithium manganates [Li$_{1+x}$Mn$_{2-x}$O$_4$ (x=0–0.33), Li$_{1+x}$Mn$_{2-x-y}$M$_y$O$_4$ (where M includes at least one metal selected from Ni, Co, Cr, Cu, Fe, Al and Mg, and x=0–0.33, y=0–1.0, and 2−x−y>0), LiMnO$_3$, LiMn$_2$O$_3$, LiMnO$_2$, LiMn$_{2-x}$M$_x$O$_2$ (where M includes at least one metal selected from Co, Ni, Fe, Cr, Zn and Ta, and x=0.01–0.1), Li$_2$Mn$_3$MO$_8$ (where M includes at least one metal selected from Fe, Co, Ni, Cu and Zn)], copper-lithium oxides (Li$_2$CuO$_2$), and mixtures containing vanadium oxides such as LiV$_3$O$_8$, LiFe$_3$O$_4$, V$_2$O$_5$, Cu$_2$V$_2$O$_7$, etc., disulfide compounds, and Fe$_2$(MoO$_4$)$_3$, etc.

As negative electrodes which reversibly intercalate and deintercalate lithium used in the present invention, there may be used natural graphite, graphitized materials prepared by heat treating readily-graphitizable materials obtained from petroleum cokes, coal pitch cokes, etc. at high temperatures of not lower than 2500° C., mesophase carbon or amorphous carbon, carbon fibers, metals capable of alloying with lithium, materials comprising carbon particles having metals supported on the surface, etc. Examples thereof are metals selected from lithium, aluminum, tin, silicon, indium, gallium and magnesium, and alloys thereof. Furthermore, these metals or oxides of them can be utilized as negative electrodes.

Uses of the lithium ion secondary batteries of the present invention are not particularly limited, and, for example, they can be used as electric sources of IC cards, personal computers, large-sized electronic computers, notebook type personal computers, pen input personal computers, notebook type word processors, portable telephones, portable cards, wristwatches, cameras, electric shavers, cordless telephones, facsimiles, video, video cameras, electronic pocketbooks, desk electric calculators, electronic pocketbooks with communication functions, portable copying machines, liquid crystal televisions, electric tools, cleaners, game devices having functions such as virtual reality, toys, electric bicycles, walk assisting machines for medical care, wheelchairs for medical care, moving beds for medical care, escalators, elevators, forklifts, golf carts, electric sources for emergency, load conditioners, power storage systems, etc. Furthermore, they can be used for war materials and space materials in addition to materials for public uses.

DESCRIPTION OF THE PREFERRED EMBODIMENTS

The present invention will be explained in more detail by the following examples, which should not be construed as limiting the invention in any manner. Unless otherwise notified, preparation of samples and evaluation of ionic conductivity were carried out in argon atmosphere in the examples. Moreover, in all the examples and comparative examples, concentration of the electrolytic salt added was adjusted so that the molar ratio based on the total molar number of ether oxygen atoms in the oxyalkylene group in the ion conductive polymer [(molar number of electrolytic salt)/(total molar number of ether oxygen atoms in oxyalkylene group)] was 0.125. The examples and the comparative examples are shown in Table 1.

TABLE 1

| Example | Molar number of the compound of the formula (1) (mmol) | Molar number of the compound of the formula (2) (mmol) | Molar number of the compound of the formula (3) (mmol) | Carbon number in oxyalkylene group 4 | 3 | 2 | Electrolytic salt LiBF$_4$ | LiPF$_6$ | LiN(CF$_3$SO$_2$)$_2$ |
|---|---|---|---|---|---|---|---|---|---|
| 1 | 10 | — | — | ○ | — | — | ○ | — | — |
| 2 | 10 | — | — | ○ | — | — | — | ○ | — |
| 3 | 10 | — | — | ○ | — | — | — | — | ○ |
| 4 | 10 | — | — | — | ○ | — | ○ | — | — |
| 5 | 10 | — | — | — | ○ | — | — | ○ | — |
| 6 | 10 | — | — | — | ○ | — | — | — | ○ |
| 7 | 10 | — | — | — | — | ○ | ○ | — | — |
| 8 | 10 | — | — | — | — | ○ | — | ○ | — |
| 9 | 10 | — | — | — | — | ○ | — | — | ○ |
| 10 | — | 10 | 10 | ○ | — | — | ○ | — | — |
| 11 | — | 10 | 10 | ○ | — | — | — | ○ | — |
| 12 | — | 10 | 10 | ○ | — | — | — | — | ○ |
| 13 | — | 10 | 10 | — | ○ | — | ○ | — | — |
| 14 | — | 10 | 10 | — | ○ | — | — | ○ | — |
| 15 | — | 10 | 10 | — | ○ | — | — | — | ○ |
| 16 | — | 10 | 10 | — | — | ○ | ○ | — | — |
| 17 | — | 10 | 10 | — | — | ○ | — | ○ | — |
| 18 | — | 10 | 10 | — | — | ○ | — | — | ○ |
| 19 | — | 10 | 20 | ○ | — | — | ○ | — | — |
| 20 | — | 10 | 20 | ○ | — | — | — | ○ | — |
| 21 | — | 10 | 20 | ○ | — | — | — | — | ○ |
| 22 | — | 10 | 20 | — | ○ | — | ○ | — | — |
| 23 | — | 10 | 20 | — | ○ | — | — | ○ | — |
| 24 | — | 10 | 20 | — | ○ | — | — | — | ○ |
| 25 | — | 10 | 20 | — | — | ○ | ○ | — | — |
| 26 | — | 10 | 20 | — | — | ○ | — | ○ | — |
| 27 | — | 10 | 20 | — | — | ○ | — | — | ○ |
| 28 | — | 3 | 17 | — | — | ○ | ○ | — | — |
| 29 | — | 3 | 17 | — | — | ○ | — | ○ | — |
| 30 | — | 3 | 17 | — | — | ○ | — | — | ○ |
| Comparative Example 1 | — | — | — | — | — | — | — | — | — |
| Comparative Example 2 | — | — | — | — | — | — | — | — | — |

1. Examples of Preparation of Electrodes:

(Positive electrode): CELLSEED (lithium cobaltate manufactured by Nippon Chemical Industrial Co., Ltd.), SP270 (graphite manufactured by Japan Graphite Co., Ltd.) and KF1120 (polyvinylidene fluoride manufactured by Kureha Chemical Industry Co., Ltd.) were mixed at a ratio of 80:10:10 in % by weight, and the mixture was introduced into N-methyl-2-pyrrolidone, followed by mixing to prepare a slurry solution. The resulting slurry was coated on an aluminum foil of 20 μm in thickness by doctor blade method and dried. The coating amount of the mixture was 150 g/m². The aluminum foil was pressed to give a mixture bulk density of 3.0 g/cm³, and cut to 1 cm×1 cm to prepare a positive electrode.

(Negative electrode): CARBOTRON PE (amorphous carbon manufactured by Kureha Chemical Industry Co., Ltd.) and KF1120 (polyvinylidene fluoride manufactured by Kureha Chemical Industry Co., Ltd.) were mixed at a ratio of 90:10 in % by weight, and the mixture was introduced into N-methyl-2-pyrrolidone, followed by mixing to prepare a slurry solution. The resulting slurry was coated on a copper foil of 20 μm in thickness by doctor blade method and dried. The coating amount of the mixture was 70 g/m². The copper foil coated with the slurry was pressed to give a mixture bulk density of 1.0 g/cm³, and cut to 1.2 cm×1.2 cm to prepare a negative electrode.

2. Method of Evaluation:

(Ionic conductivity): Measurement of ionic conductivity was conducted by an alternating current impedance method which comprises constructing an electrochemical cell by putting a polymer electrolyte between stainless steel electrodes at 25° C., passing an alternating current between the electrodes and measuring the resistant components, and the ionic conductivity was calculated from real-number impedance intercept in a Cole-Cole plot.

(Charging and discharging conditions of battery): Charging and discharging were carried out at 25° C. and at a current density of 0.5 mA/cm² using a charging and discharging device (TOSCAT 3000 manufactured by Toyo System Co., Ltd.). A constant current charging was carried out up to 4.2 V, and after the voltage reached 4.2 V, a constant voltage charging was carried out for 12 hours. Furthermore, a constant current discharging was carried out until a cut-off voltage of discharge reached 3.5 V. The capacity obtained by the first discharging was taken as an initial discharge capacity. Charging-discharging under the above conditions was 1 cycle, and the charging and the discharging were repeated until the capacity reached 70% or lower of the initial discharge capacity, and the number of repetition was taken as cycle characteristic. Furthermore, a constant current charging was carried out at a current density of 1 mA/cm² up to 4.2 V, and after the voltage reached 4.2 V, a constant voltage charging was carried out for 12 hours. Furthermore, a constant current discharging was carried out until a cut-off voltage of discharge reached 3.5 V. The resulting capacity and the initial cycle capacity obtained by the above charge and discharge cycle were compared, and the ratio was taken as a high-rate charge and discharge characteristics.

EXAMPLE 1

207.6 Grams (2.0 mols) of trimethyl borate was added to 230 g (1.0 mol) of dibutylene glycol monomethacrylate and 496 g (2.0 mols) of tributylene glycol monomethyl ether, followed by keeping them at 60° C. for 1 hour with stirring in a dry air atmosphere and then heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 720 g of the polymerizable boron-containing compound A represented by the formula (1). The infrared absorption spectrum of the resulting polymerizable boron-containing compound A was measured to confirm that the absorption band originating from hydroxyl group at 3300 cm$^{-1}$ disappeared.

Then, 7.34 g (10 mmols) of the polymerizable boron-containing compound A, 7.34 mg of 2,2'-azobisisobutyronitrile and LiBF$_4$ as an electrolytic salt were mixed. Successively, this solution was poured into a polytetrafluoroethylene die and kept at 80° C. for 6 hours to obtain a polymer electrolyte. The thus obtained film of electrolyte was cut to a disc of 1 cm in diameter, which was put between a pair of stainless steel electrodes and the ionic conductivity was obtained by the above-mentioned method for measurement of ionic conductivity at 25° C. The ionic conductivity obtained was 1.1 mS/cm, which was higher than that obtained in Comparative Examples 1 and 2 given hereinafter. Furthermore, the solution was cast on the positive electrode and negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.0 mAh, and the cycle characteristic was 138 times. Furthermore, the high rate discharge characteristic was 80%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 2

A polymer electrolyte and a battery were produced in the same manner as in Example 1, except that LiPF6 was used in place of LiBF$_4$ as the electrolytic salt. The ionic conductivity of the polymer electrolyte was 1.2 mS/cm, which was higher than that obtained in Comparative Examples 1 and 2 given hereinafter. The initial discharge capacity of the battery was 1.0 mAh, and the cycle characteristic was 138 times. Furthermore, high rate discharge characteristic was 80%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 3

A polymer electrolyte and a battery were produced in the same manner as in Example 1, except that LiN(CF$_3$SO$_2$)$_2$ was used in place of LiBF$_4$ as the electrolytic salt. The ionic conductivity of the polymer electrolyte was 1.4 mS/cm, which was higher than that obtained in Comparative Examples 1 and 2 given hereinafter. The initial discharge capacity of the battery was 1.0 mAh, and the cycle characteristic was 138 times. Furthermore, high rate discharge characteristic was 80%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 4

207.6 Grams (2.0 mols) of trimethyl borate was added to 202 g (1.0 mol) of dipropylene glycol monomethacrylate and 412 g (2.0 mols) of tripropylene glycol monomethyl ether, followed by keeping them at 60° C. for 1 hour with stirring in a dry air atmosphere and then heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 610 g of the polymerizable boron-containing compound B represented by the formula (1). An infrared absorption spectrum of the resulting polymerizable boron-containing compound B was measured to confirm that the absorption band originating from hydroxyl group at 3300 cm$^{-1}$ disappeared.

Then, 6.22 g (10 mmols) of the polymerizable boron-containing compound B, 6.22 mg of 2,2'-azobisisobutyronitrile and LiBF$_4$ as an electrolytic salt were mixed. Successively, a polymer electrolyte was produced using the resulting solution by the method of Example 1, and the ionic conductivity was measured by the method of Example 1. The ionic conductivity obtained was 1.4 mS/cm, which was higher than that obtained in Comparative Examples 1 and 2 given hereinafter. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.0 mAh, and the cycle characteristic was 140 times. Furthermore, the high rate discharge characteristic was 80%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 5

A polymer electrolyte and a battery were produced in the same manner as in Example 4, except that $LiPF_6$ was used in place of $LiBF_4$ as the electrolytic salt. The ionic conductivity of the polymer electrolyte was 1.4 mS/cm, which was higher than that obtained in Comparative Examples 1 and 2 given hereinafter. The initial discharge capacity of the battery was 1.0 mAh, and the cycle characteristic was 140 times. Furthermore, the high rate discharge characteristic was 85%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 6

A polymer electrolyte and a battery were produced in the same manner as in Example 4, except that $LiN(CF_3SO_2)_2$ was used in place of $LiBF_4$ as the electrolytic salt. The ionic conductivity of the polymer electrolyte was 1.5 mS/cm, which was higher than that obtained in Comparative Examples 1 and 2 given hereinafter. The initial discharge capacity of the battery was 1.0 mAh, and the cycle characteristic was 140 times. Furthermore, the high rate discharge characteristic was 85%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 7

207.6 Grams (2.0 mols) of trimethyl borate was added to 174 g (1.0 mol) of diethylene glycol monomethacrylate and 328 g (2.0 mols) of triethylene glycol monomethyl ether, followed by keeping them at 60° C. for 1 hour with stirring in a dry air atmosphere and then heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 495 g of a polymerizable boron-containing compound C represented by the formula (1). An infrared absorption spectrum of the resulting polymerizable boron-containing compound C was measured to confirm that the absorption band originating from hydroxyl group at 3300 $cm^{-1}$ disappeared.

Then, 5.10 g (10 mmols) of the polymerizable boron-containing compound C, 5.10 mg of 2,2'-azobisisobutyronitrile and $LiBF_4$ as the electrolytic salt were mixed. Successively, a polymer electrolyte was produced using the resulting solution by the method of Example 1, and the ionic conductivity was measured by the method of Example 1. The ionic conductivity obtained was 1.6 mS/cm, which was higher than that obtained in Comparative Examples 1 and 2 given hereinafter. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.0 mAh, and the cycle characteristic was 150 times. Furthermore, the high rate discharge characteristic was 85%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 8

A polymer electrolyte and a battery were produced in the same manner as in Example 7, except that $LiPF_6$ was used in place of $LiBF_4$ as the electrolytic salt. The ionic conductivity of the polymer electrolyte was 1.8 mS/cm, which was higher than that obtained in Comparative Examples 1 and 2 given hereinafter. The initial discharge capacity of the battery was 1.0 mAh, and the cycle characteristic was 150 times. Furthermore, the high rate discharge characteristic was 85%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 9

A polymer electrolyte and a battery were produced in the same manner as in Example 7, except that $LiN(CF_3SO_2)_2$ was used in place of $LiBF_4$ as the electrolytic salt. The ionic conductivity of the polymer electrolyte was 2.0 mS/cm, which was higher than that obtained in Comparative Examples 1 and 2 given hereinafter. The initial discharge capacity of the battery was 1.0 mAh, and the cycle characteristic was 150 times. Furthermore, the high rate discharge characteristic was 85%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 10

207.6 Grams (2.0 mols) of trimethyl borate was added to 690 g (3.0 mols) of dibutylene glycol monomethacrylate. The mixture was heated to 60° C. with stirring in a dry air atmosphere and kept at 60° C. for 1 hour, followed by heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 685 g of a polymerizable boron-containing compound D (an esterification product of boric acid with dibutylene glycol monomethacrylate) represented by the formula (2). An infrared absorption spectrum of the resulting polymerizable boron-containing compound D was measured to confirm that the absorption band originating from hydroxyl group at 3300 $cm^{-1}$ disappeared.

207.6 Grams (2.0 mols) of trimethyl borate was added to 744 g (3.0 mols) of tributylene glycol monomethyl ether. The mixture was heated to 60° C. with stirring in a dry nitrogen atmosphere. After the mixture was kept at 60° C. for 1 hour, it was heated to 120° C. over a period of 1 hour. After the temperature reached 120° C., the pressure in the system was gradually reduced. The system was kept at a pressure of 2.67 kPa (20 mmHg) or lower for 3 hours to remove volatile matters produced with progress of ester interchange reaction of boric acid and excess trimethyl borate, followed by filtration to obtain 740 g of a polymerizable boron-containing compound E (an esterification product of boric acid with tributylene glycol monomethyl ether) represented by the formula (3). An infrared absorption spectrum of the resulting polymerizable boron-containing compound E was measured to confirm that the absorption band originating from hydroxyl group at 3300 cm$^{-1}$ disappeared.

Then, 6.98 g (10 mmols) of the polymerizable boron-containing compound D (an esterification product of boric acid with dibutylene glycol monomethacrylate), 7.52 g (10 mmols) of the polymerizable boron-containing compound E (an esterification product of boric acid with tributylene glycol monomethyl ether), 6.98 mg of 2,2'-azobisisobutyronitrile and LiBF$_4$ as an electrolytic salt were mixed. Successively, a polymer electrolyte was produced using the resulting solution by the same method as in Example 1, and the ionic conductivity was measured by the method of Example 1. The ionic conductivity obtained was 1.1 mS/cm, which was higher than that obtained in Comparative Examples 1 and 2 given hereinafter. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.1 mAh, and the cycle characteristic was 150 times. Furthermore, the high rate discharge characteristic was 88%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 11

A polymer electrolyte and a battery were produced in the same manner as in Example 10, except that LiPF$_6$ was used in place of LiBF$_4$ as the electrolytic salt. The ionic conductivity of the polymer electrolyte was 1.1 mS/cm, which was higher than that obtained in Comparative Examples 1 and 2 given hereinafter. The initial discharge capacity of the battery was 1.1 mAh, and the cycle characteristic was 175 times. Furthermore, the high rate discharge characteristic was 88%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 12

A polymer electrolyte and a battery were produced in the same manner as in Example 10, except that LiN(CF$_3$ SO$_2$)$_2$ was used in place of LiBF$_4$ as the electrolytic salt. The ionic conductivity of the polymer electrolyte was 1.1 mS/cm, which was higher than that obtained in Comparative Examples 1 and 2 given hereinafter. The initial discharge capacity of the battery was 1.1 mAh, and the cycle characteristic was 175 times. Furthermore, the high rate discharge characteristic was 88%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 13

207.6 Grams (2.0 mols) of trimethyl borate was added to 606 g (3.0 mols) of dipropylene glycol monomethacrylate. The mixture was heated to 60° C. with stirring in a dry air atmosphere. The mixture was kept at 60° C. for 1 hour, followed by heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 600 g of a polymerizable boron-containing compound F (an esterification product of boric acid with dipropylene glycol monomethacrylate) represented by the formula (2). An infrared absorption spectrum of the resulting polymerizable boron-containing compound F was measured to confirm that the absorption band originating from hydroxyl group at 3300 cm$^{-1}$ disappeared.

Then, 207.6 g (2.0 mols) of trimethyl borate was added to 618 g (3.0 mols) of tripropylene glycol monomethyl ether. The mixture was heated to 60° C. with stirring in a dry nitrogen atmosphere. After the mixture was kept at 60° C. for 1 hour, it was heated to 120° C. over a period of 1 hour. After the temperature reached 120° C., the pressure in the system was gradually reduced. The system was kept at a pressure of 2.67 kPa (20 mmHg) or lower for 3 hours to remove volatile matters produced with progress of ester interchange reaction of boric acid and excess trimethyl borate, followed by filtration to obtain 610 g of a polymerizable boron-containing compound G (an esterification product of boric acid with tripropylene glycol monomethyl ether) represented by the formula (3). An infrared absorption spectrum of the resulting polymerizable boron-containing compound G was measured to confirm that the absorption band originating from hydroxyl group at 3300 cm$^{-1}$ disappeared.

Then, 6.14 g (10 mmols) of the polymerizable boron-containing compound F (an esterification product of boric acid with dipropylene glycol monomethacrylate), 6.26 g of the polymerizable boron-containing compound G (an esterification product of boric acid with tripropylene glycol monomethyl ether), 6.14 mg of 2,2'-azobisisobutyronitrile and LiBF$_4$ as an electrolytic salt were mixed. Successively, a polymer electrolyte was produced using the resulting solution by the same method as in Example 1, and the ionic conductivity was measured by the method of Example 1. The ionic conductivity obtained was 1.2 mS/cm, which was higher than that obtained in Comparative Examples 1 and 2 given hereinafter.

Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.2 mAh, and the cycle characteristic was 175 times. Furthermore, the high rate discharge characteristic was 88%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 14

A polymer electrolyte and a battery were produced in the same manner as in Example 13, except that LiPF6 was used in place of $LiBF_4$ as the electrolytic salt. The ionic conductivity of the polymer electrolyte was 1.2 mS/cm, which was higher than that obtained in Comparative Examples 1 and 2 given hereinafter. The initial discharge capacity of the battery was 1.2 mAh, and the cycle characteristic was 188 times. Furthermore, the high rate discharge characteristic was 90%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 15

A polymer electrolyte and a battery were produced in the same manner as in Example 13, except that $LiN(CF_3 SO_2)_2$ was used in place of LiBF4 as the electrolytic salt. The ionic conductivity of the polymer electrolyte was 1.2 mS/cm, which was higher than that obtained in Comparative Examples 1 and 2 given hereinafter. The initial discharge capacity of the battery was 1.2 mAh, and the cycle characteristic was 188 times. Furthermore, the high rate discharge characteristic was 90%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 16

207.6 Grams (2.0 mols) of trimethyl borate was added to 522 g (3.0 mols) of diethylene glycol monomethacrylate. The mixture was heated to 60° C. with stirring in a dry air atmosphere. The mixture was kept at 60° C. for 1 hour, followed by heating to 75° C. After the temperature reached 75° C., the pressure in the system was gradually reduced. The system was kept at a pressure of 2.67 kPa (20 mmHg) or lower for 6 hours to remove volatile matters produced with progress of ester interchange reaction of boric acid and excess trimethyl borate, followed by filtration to obtain 515 g of a polymerizable boron-containing compound H (an esterification product of boric acid with diethylene glycol monomethacrylate) represented by the formula (2). An infrared absorption spectrum of the resulting polymerizable boron-containing compound H was measured to confirm that the absorption band originating from hydroxyl group at 3300 cm$^{-1}$ disappeared.

Then, 207.6 g (2.0 mols) of trimethyl borate was added to 492 g (3.0 mols) of triethylene glycol monomethyl ether. The mixture was heated to 60° C. with stirring in a dry nitrogen atmosphere. After the mixture was kept at 60° C. for 1 hour, it was heated to 120° C. over a period of 1 hour. After the temperature reached 120° C., the pressure in the system was gradually reduced. The system was kept at a pressure of 2.67 kPa (20 mmHg) or lower for 3 hours to remove volatile matters produced with progress of ester interchange reaction of boric acid and excess trimethyl borate, followed by filtration to obtain 1485 g of a polymerizable boron-containing compound I (an esterification product of boric acid with triethylene glycol monomethyl ether) represented by the formula (3). An infrared absorption spectrum of the resulting polymerizable boron-containing compound I was measured to confirm that the absorption band originating from hydroxyl group at 3300 cm$^{-1}$ disappeared.

Then, 5.30 g (10 mmols) of the polymerizable boron-containing compound H (an esterification product of boric acid with diethylene glycol monomethacrylate), 15.00 g of the polymerizable boron-containing compound I (an esterification product of boric acid with triethylene glycol monomethyl ether), 5.30 mg of 2,2'-azobisisobutyronitrile and $LiBF_4$ as an electrolytic salt were mixed. Successively, a polymer electrolyte was produced using the resulting solution by the same method as in Example 1, and the ionic conductivity of the polymer electrolyte was measured by the method of Example 1. The ionic conductivity obtained was 1.3 mS/cm, which was higher than that obtained in Comparative Examples 1 and 2 given hereinafter. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 1.3 mAh, and the cycle characteristic was 188 times. Furthermore, the high rate discharge characteristic was 90%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 17

A polymer electrolyte and a battery were produced in the same manner as in Example 16, except that $LiPF_6$ was used in place of $LiBF_4$ as the electrolytic salt. The ionic conductivity of the polymer electrolyte was 1.3 mS/cm, which was higher than that obtained in Comparative Examples 1 and 2 given hereinafter. The initial discharge capacity of the battery was 1.3 mAh, and the cycle characteristic was 190 times. Furthermore, the high rate discharge characteristic was 92%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 18

A polymer electrolyte and a battery were produced in the same manner as in Example 16, except that $LiN(CF_3SO_2)_2$ was used in place of $LiBF_4$ as the electrolytic salt. The ionic conductivity of the polymer electrolyte was 1.3 mS/cm, which was higher than that obtained in Comparative Examples 1 and 2 given hereinafter. The initial discharge capacity of the battery was 1.3 mAh, and the cycle characteristic was 200 times. Furthermore, the high rate discharge characteristic was 92%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 19

A polymer electrolyte and a battery were produced in the same manner as in Example 10, except that the amount of 7.52 g (10 mmols) of the boron-containing compound E (an esterification product of boric acid with tributylene glycol monomethyl ether) was changed to 15.0 g (20 mmols). The ionic conductivity of the polymer electrolyte was 1.4 mS/cm, which was higher than that obtained in Comparative Examples 1 and 2 given hereinafter. The initial discharge capacity of the battery was 1.4 mAh, and the cycle characteristic was 210 times. Furthermore, the high rate discharge characteristic was 92%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 20

A polymer electrolyte and a battery were produced in the same manner as in Example 19, except that $LiPF_6$ was used in place of $LiBF_4$ as the electrolytic salt. The ionic conductivity of the polymer electrolyte was 1.4 mS/cm, which was higher than that obtained in Comparative Examples 1 and 2 given hereinafter. The initial discharge capacity of the battery was 1.4 mAh, and the cycle characteristic was 210 times. Furthermore, the high rate discharge characteristic was 92%, and thus the battery was superior to those obtained in Comparative Examples 1 and 2 in initial discharge capacity, cycle characteristics and high rate discharge characteristics. When the aluminum laminate-film of the battery was stripped off, there was recognized no flow of the electrolyte in the battery.

EXAMPLE 21

A polymer electrolyte and a battery were produced in the same manner as in Example 19, except that $LiN(CF_3SO_2)_2$ was used in place of $LiBF_4$ as the electrolytic salt. The ionic conductivity of the polymer electrolyte was 1.6 mS/cm, which was higher than that obtained in Comparative Examples 1 and 2 given hereinafter. The initial discharge capacity of the battery was 1.6 mAh, and the cycle characteristic was 215 times. Furthermore, the high rate discharge characteristic was 95%, and the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 22

A polymer electrolyte and a battery were produced in the same manner as in Example 13, except that the amount of 6.26 g (10 mmols) of the boron-containing compound G (an esterification product of boric acid with tripropylene glycol monomethyl ether) was changed to 12.5 g (20 mmols). The ionic conductivity of the polymer electrolyte was 1.6 mS/cm, which was higher than that obtained in Comparative Examples 1 and 2 given hereinafter. The initial discharge capacity of the battery was 1.6 mAh, and the cycle characteristic was 215 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 23

A polymer electrolyte and a battery were produced in the same manner as in Example 22, except that $LiPF_6$ was used in place of $LiBF_4$ as the electrolytic salt. The ionic conductivity of the polymer electrolyte was 1.6 mS/cm, which was higher than that obtained in Comparative Examples 1 and 2 given hereinafter. The initial discharge capacity of the battery was 1.6 mAh, and the cycle characteristic was 225 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 24

A polymer electrolyte and a battery were produced in the same manner as in Example 22, except that $LiN(CF_3SO_2)_2$ was used in place of $LiBF_4$ as the electrolytic salt. The ionic conductivity of the polymer electrolyte was 1.8 mS/cm, which was higher than that obtained in Comparative Examples 1 and 2 given hereinafter. The initial discharge capacity of the battery was 1.8 mAh, and the cycle characteristic was 225 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 25

A polymer electrolyte and a battery were produced in the same manner as in Example 16, except that the amount of 5.00 g (10 mmols) of the boron-containing compound I (an esterification product of boric acid with triethylene glycol monomethyl ether) was changed to 10.0 g (20 mmols). The ionic conductivity of the polymer electrolyte was 1.8 mS/cm, which was higher than that obtained in Comparative Examples 1 and 2 given hereinafter. The initial discharge capacity of the battery was 1.8 mAh, and the cycle characteristic was 240 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 26

A polymer electrolyte and a battery were produced in the same manner as in Example 25, except that $LiPF_6$ was used in place of $LiBF_4$ as the electrolytic salt. The ionic conductivity of the polymer electrolyte was 1.8 mS/cm, which was higher than that obtained in Comparative Examples 1 and 2 given hereinafter. The initial discharge capacity of the battery was 1.8 mAh, and the cycle characteristic was 240 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 27

A polymer electrolyte and a battery were produced in the same manner as in Example 25, except that $LiN(CF_3 SO_2)_2$ was used in place of $LIBF_4$ as the electrolytic salt. The ionic conductivity of the polymer electrolyte was 2.0 mS/cm, which was higher than that obtained in Comparative Examples 1 and 2 given hereinafter. The initial discharge capacity of the battery was 1.8 mAh, and the cycle characteristic was 250 times. Furthermore, the high rate discharge characteristic was 95%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 28

A polymer electrolyte and a battery were produced in the same manner as in Example 16, except that the amount of the polymerizable boron-containing compound H (an esterification product of boric acid with diethylene glycol monomethacrylate) was 1.59 g (3 mmol) instead of 5.30 g (10 mmol), and the amount of the polymerizable boron-containing compound I (an esterification product of boric acid with triethylene glycol monomethyl ether) was 8.5 g (17 mmol) instead of 5.00 g (10 mmol). The ionic conductivity of the polymer electrolyte was 2.1 mS/cm, which was higher than that obtained in Comparative Examples 1 and 2 given hereinafter.

The initial discharge capacity of the battery was 1.9 mAh, and the cycle characteristic was 255 times. Furthermore, the high rate discharge characteristic was 96%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 29

A polymer electrolyte and a battery were produced in the same manner as in Example 28, except that $LiPF_6$ was used in place of $LiBF_4$ as the electrolytic salt. The ionic conductivity of the polymer electrolyte was 2.1 mS/cm, which was higher than that obtained in Comparative Examples 1 and 2 given hereinafter.

The initial discharge capacity of the battery was 1.9 mAh, and the cycle characteristic was 255 times. Furthermore, the high rate discharge characteristic was 96%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

EXAMPLE 30

A polymer electrolyte and a battery were produced in the same manner as in Example 28, except that $LiN(CF_3 SO_2)_2$ was used in place of $LiBF_4$ as the electrolytic salt. The ionic conductivity of the polymer electrolyte was 2.2 mS/cm, which was higher than that obtained in Comparative Examples 1 and 2 given hereinafter.

The initial discharge capacity of the battery was 2 mAh, and the cycle characteristic was 260 times. Furthermore, the high rate discharge characteristic was 96%, and thus the battery was superior to those obtained in Comparative Examples 1 and 2 in initial discharge capacity, cycle characteristics and high rate discharge characteristics. When the aluminum laminate film of the battery was stripped off, there was recognized no flow of the electrolyte in the battery.

COMPARATIVE EXAMPLE 1

34.8 Grams (0.5 mol) of boric acid anhydride was added to 1308 g (3.0 mols) of BLEMMER PE-350 (polyethylene glycol (350) monomethacrylate) manufactured by Nippon Oil & Fats Co., Ltd. as starting materials, followed by heating to 70° C. in a dry air atmosphere. After the temperature reached 70° C., the pressure in the system was gradually reduced, and the system was kept at a pressure of 2.67 kPa (20 mmHg) or lower for 15 hours to remove water produced with progress of the reaction, followed by filtration to obtain a polymerizable boron-containing compound J. Then, 2.58 g of $LiN(CF_3 SO_2)_2$ was added as an electrolytic salt to 4.00 g of the polymerizable boron-containing compound J to uniformly dissolve the electrolytic salt, and then using this solution the ionic conductivity of the polymer electrolyte was measured by the same method as in Example 1. The ionic conductivity obtained was 0.025 mS/cm. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 0.00009 mAh, and the cycle characteristic was 3 times. Furthermore, the high rate discharge characteristic was 5%. When the aluminum laminate film of the battery was stripped off, there was recognized no flow of the electrolyte in the battery.

COMPARATIVE EXAMPLE 2

11.6 Grams (0.167 mol) of boric acid anhydride was added to 550 g (1.0 mol) of methoxypolyethylene glycol having a molecular weight of 550 as starting materials, followed by heating to 110° C. in a nitrogen gas atmosphere. After the temperature reached 110° C., the pressure in the system was gradually reduced, and the system was kept at a pressure of 2.67 kPa (20 mmHg) or lower for 3 hours to remove water produced with progress of the reaction, followed by filtration to obtain a boron-containing compound K. Then, 2.00 g of the boron-containing compound K was mixed with 2.00 g of the boron-containing compound J, and 2.81 g of $LiN(CF_3SO_2)_2$ was added as an electrolytic salt to uniformly dissolve the electrolytic salt, and then using this solution the ionic conductivity of the electrolyte obtained in the same manner as in Example 1 was measured by the same method as in Example 1. The ionic conductivity obtained was 0.020 mS/cm. Furthermore, the solution was cast on the positive electrode and the negative electrode produced by the above-mentioned method, and kept at 80° C. for 6 hours to produce polymer electrolytes on the positive electrode and the negative electrode. Furthermore, these positive electrode and negative electrode were put one upon another, and these were stuck together by keeping them at 80° C. for 6 hours under application of a load of 0.1 MPa.

Then, as shown in FIG. 1, stainless steel terminals 5 and 6 were attached to positive electrode 1 and negative electrode 2, and these were inserted in a bag-shaped aluminum laminate film 7. The initial discharge capacity of the obtained battery was 0.0009 mAh, and the cycle characteristic was 10 times. Furthermore, the high rate discharge characteristic was 10%. When the aluminum laminate film of the battery was stripped off, there was recognized no flow of the electrolyte in the battery.

The results obtained in the above examples and comparative examples are shown in Table 2.

TABLE 2

| Example | Ion conductivity (mS/sm) | Initial discharge capacity (mAh) | Cycle performance (cycle number) | High rate discharge characteristics (%) |
|---|---|---|---|---|
| 1 | 1.1 | 1 | 138 | 80 |
| 2 | 1.2 | 1 | 138 | 80 |
| 3 | 1.4 | 1 | 138 | 80 |
| 4 | 1.4 | 1 | 140 | 80 |
| 5 | 1.4 | 1 | 140 | 85 |
| 6 | 1.5 | 1 | 140 | 85 |
| 7 | 1.6 | 1 | 150 | 85 |
| 8 | 1.8 | 1 | 150 | 85 |
| 9 | 2 | 1 | 150 | 85 |
| 10 | 1.1 | 1.1 | 150 | 88 |
| 11 | 1.1 | 1.1 | 175 | 88 |
| 12 | 1.1 | 1.1 | 175 | 88 |
| 13 | 1.2 | 1.2 | 175 | 88 |
| 14 | 1.2 | 1.2 | 188 | 90 |
| 15 | 1.2 | 1.2 | 188 | 90 |
| 16 | 1.3 | 1.3 | 188 | 90 |
| 17 | 1.3 | 1.3 | 190 | 92 |
| 18 | 1.3 | 1.3 | 200 | 92 |
| 19 | 1.4 | 1.4 | 210 | 92 |
| 20 | 1.4 | 1.4 | 210 | 92 |
| 21 | 1.6 | 1.6 | 215 | 95 |
| 22 | 1.6 | 1.6 | 215 | 95 |
| 23 | 1.6 | 1.6 | 225 | 95 |
| 24 | 1.8 | 1.8 | 225 | 95 |
| 25 | 1.8 | 1.8 | 240 | 95 |
| 26 | 1.8 | 1.8 | 240 | 95 |
| 27 | 2 | 1.8 | 250 | 95 |
| 28 | 2.1 | 1.9 | 255 | 96 |
| 29 | 2.1 | 1.9 | 255 | 96 |
| 30 | 2.2 | 2 | 260 | 96 |
| Comparative Example 1 | 0.025 | 0.00009 | 3 | 5 |
| Comparative Example 2 | 0.02 | 0.0009 | 10 | 10 |

According to the present invention, batteries of high output can be obtained which are excellent in initial charge and discharge capacities, cycle life and high rate discharge characteristics.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A lithium secondary battery having a positive electrode and a negative electrode which reversibly intercalate and deintercalate lithium, the negative electrode containing amorphous carbon, and an electrolyte containing an ion conductive material and an electrolytic salt, where the ion conductive material comprises a polymerizable composition which contains a boron-containing compound represented by the following formula (2) and a boron-containing compound represented by the following formula (3):

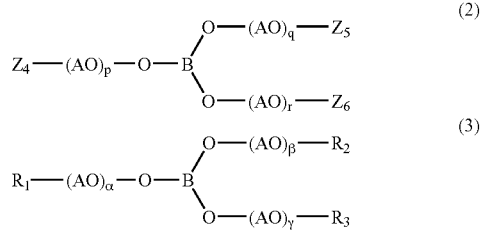

wherein B represents a boron atom; $Z_4$, $Z_5$ and $Z_6$ each represent an organic group having an acryloyl group or a methacryloyl group or a hydrocarbon group of 1-10 carbon atoms, with the proviso that at least one of $Z_4$, $Z_5$ and $Z_6$ is said organic group having an acryloyl group or a methacryloyl group; $R_1$, $R_2$ and $R_3$ each represent a hydrocarbon group of 1-10 carbon atoms; AO represents an oxyalkylene group of 1-6 carbon atoms; and each of p, q, r, α, β and γ is more than 0 and less than 4, provided that each of the sum p+q+r and the sum α+β+γ is 1 or more.

2. A lithium secondary battery according to claim 1, wherein the molar ratio of the compound of the formula (2) and the compound of the formula (3) [(molar number of the compound of the formula (3))/( molar number of the compound of the formula (2))] is 0.1 to 9.

3. A lithium secondary battery according to claim 2, wherein the electrolyte contains a polymer obtained by polymerizing the polymerizable composition.

4. A lithium secondary battery according to claim 2, wherein the electrolytic salt is selected from the group consisting of $LiPF_6$, $LiN(CF_3SO_2)_2$, $LiClO_4$, $LiBF_4$, $LiAsF_6$, LiI, LiBr, LiSCN, $Li_2B_{10}Cl_{10}$ and $LiCF_3CO_2$.

5. A lithium secondary battery according to claim 2, wherein said molar ratio is 0.5 to 4.

6. A lithium secondary battery according to claim 5, wherein said molar ratio is 1-2.5.

7. A lithium secondary battery according to claim 1, wherein the electrolyte contains a polymer obtained by polymerizing the polymerizable composition.

8. A lithium secondary battery according to claim 1, wherein the electrolytic salt is selected from the group consisting of $LiPF_6$, $LiN(CF_3SO_2)_2$, $LiClO_4$, $LiBF_4$, $LiAsF_6$, LiI, LiBr, LiSCN, $Li_2B_{10}Cl_{10}$ and $LiCF_3CO_2$.

9. A lithium secondary battery according to claim 1, wherein each of the compounds represented by the formula (2) and by the formula (3) has a molecular weight of 300-1000.

10. A lithium secondary battery according to claim 1, wherein each of the compounds represented by the formula (2) and by the formula (3) has a molecular weight of 500-800.

11. A lithium secondary battery according to claim 1, wherein the number of carbon atoms in AO is 1-4.

12. A lithium secondary battery according to claim 1, wherein all of $Z_4$, $Z_5$ and $Z_6$ are organic groups having an acryloyl group or a methacryloyl group.

13. A lithium secondary battery according to claim 1, wherein p, q, r, $\alpha$, $\beta$ and $\gamma$ are each 1-3; and p+q+r and $\alpha+\beta+\gamma$ are each equal to 3-9.

14. A lithium secondary battery according to claim 1, wherein said polymerizable composition consists essentially of said boron-containing compound represented by the formula (2) and said boron-containing compound represented by the formula (3).

15. A lithium secondary battery according to claim 1, wherein said polymerizable composition consists of said boron-containing compound represented by the formula (2) and said boron-containing compound represented by the formula (3).

16. A lithium secondary battery according to claim 1, wherein the positive electrode contains a laminar lithium compound.

* * * * *